United States Patent [19]

Kosugui

[11] 4,150,695
[45] Apr. 24, 1979

[54] SOLENOID PILOT OPERATED CHANGE-OVER VALVE

[75] Inventor: Seiji Kosugui, Soka, Japan

[73] Assignee: Shoketsu Kinzoku Kogyo Kabushiki Kaisha, Tokyo, Japan

[21] Appl. No.: 831,442

[22] Filed: Sep. 8, 1977

[30] Foreign Application Priority Data

Sep. 8, 1976 [JP] Japan .......................... 51/120850[U]

[51] Int. Cl.² .......................................... F15B 13/043
[52] U.S. Cl. ................................................ 137/625.64
[58] Field of Search .................................... 137/625.64

[56] References Cited

U.S. PATENT DOCUMENTS

| | | | |
|---|---|---|---|
| 2,965,132 | 12/1960 | Couffer | 137/625.64 |
| 3,913,620 | 10/1975 | Pauliukonis | 137/625.64 |
| 3,916,952 | 11/1975 | Pauliukonis | 137/625.64 |

*Primary Examiner*—Gerald A. Michalsky
*Attorney, Agent, or Firm*—Haight & Huard

[57] ABSTRACT

There is described a solenoid pilot operated change-over valve of the type using a spool/piston assembly which is movable in response to pressure prevailing in a pilot chamber, wherein the effective diameter of a drain valve seat in the pilot chamber is formed at least 1.4 times greater than that of a pilot valve seat on the piston through which the pilot chamber is communicable with an input port of the valve. The spool/piston assembly is reset to the initial position upon de-energization of the solenoid before the pilot valve seat is completely closed by a plunger.

1 Claim, 4 Drawing Figures

SOLENOID PILOT OPERATED CHANGE-OVER VALVE

BACKGROUND OF THE INVENTION

This invention relates to a solenoid pilot operated change-over valve employing a spool/piston assembly which is movable in response to pressure in a pilot chamber for switching flow of input pressurized fluid from one to another output port of the valve.

The conventional solenoid pilot operated change-over valves of this sort are generally constructed as shown in FIG. 1. The valve of FIG. 1 has a spool A in a first change-over position connecting an input port B with a first output port C. Upon energization of a solenoid which is mounted around a pilot valve chamber J on the outer side of the piston F, a plunger E in the pilot valve chamber is moved away from the piston F to uncover a pilot valve seat G on the piston F and attracted on the core of the solenoid to close a drain valve seat H which is provided in the core. As a result, a pilot pressure is built up in the pilot chamber J due to the fluid pressure which is supplied from the input port B through an axial passage I in the spool A, moving the piston F to the inner end of a piston chamber K. Simultaneously with the movement of the piston F, the spool A is shifted to a second change-over position connecting the input port B with a second output port L.

Under these circumstances, if the solenoid D is de-energized, the plunger E is moved away from the drain valve seat H by the action of a spring M to return to its initial position, opening the drain valve seat H while closing the pilot valve seat G on the piston F which is now at the inner end of the piston chamber K. As a result, the fluid pressure in the pilot chamber J is released through the drain valve seat H, whereupon the spool A and piston F are returned to the first change-over position by a return spring N which is mounted in the spool chamber to act on the other end of the spool A, bringing the plunger E to the initial position shown in FIG. 1.

One of the drawbacks inherent to the conventional change-over valve as shown in FIG. 1 is that it is necessary to drive the plunger through a great distance when shifting the spool/piston assembly from the second to the first change-over position since the piston is in the remotest position from the plunger. To attain this, one has to load a spring of large power and stroke length on the plunger, and at the same time mount a solenoid of large power which can cope with the large plunger-driving spring. For these reasons, it has been difficult to provide a solenoid pilot operated change-over valve which is compact and small in size.

It is an object of the present invention to provide a solenoid pilot operated change-over valve of the type mentioned above in which the spool/piston assembly is automatically reset in the initial position upon de-energization of the solenoid before the pilot valve seat is completely closed by the plunger. More particularly, the invention provides a solenoid pilot operated change-over valve wherein the effective diameter of the drain valve seat in the pilot chamber is formed at least 1.4 times greater than that of the pilot valve seat on the piston through which the pilot chamber is communicable with the input port of the valve.

It is another object of the present invention to provide a solenoid pilot operated change-over valve which employs a plunger of a minimized stroke length.

It is still another object of the invention to provide a solenoid pilot operated change-over valve which is compact and simple in construction.

SUMMARY OF THE INVENTION

According to the present invention, there is provided a solenoid pilot operated change-over valve comprising in combination: a spool casing closed at one end and internally defining a spool chamber, the spool casing being provided along the length thereof with an input port and a number of output and drain ports in communication with the spool chamber; a spool valve slidably received in the spool chamber and circumferentially having a number of sealing ridges to connect the output ports selectively either with the input port or one of the drain ports; a fluid passage formed axially through the spool valve in communication with the input port; a piston chamber provided contiguously to the other open end of the spool casing; a piston rigidly mounted at one end of the spool valve disposed at the other open end of the spool casing and axially slidable within the piston chamber, the piston having an axial bore communicating at the inner end with the axial fluid passage in the spool and forming at the outer end a pilot valve seat of a suitable effective diameter; a pilot chamber provided contiguously on the outer side of the piston chamber and having at the outer end a drain valve seat of an effective diameter at least 1.4 times greater than that of the pilot valve seat; a plunger accommodated within the pilot chamber and axially movable to open and close the pilot and drain valve seats; a plunger biasing means loaded on the plunger for constantly urging the plunger toward the pilot valve seat on the piston; a solenoid device mounted around the pilot chamber and actuatable to attract the plunger away from the pilot valve seat against the force of the plunger biasing means and seat the plunger securely on the drain valve seat, thereby introducing the fluid pressure into the pilot chamber through the axial fluid passage of the spool and the axial bore of the piston to shift the spool and piston to a different change-over position; and a return spring mounted at the closed end of the spool casing and acting to return the spool valve to the initial position.

The above and other objects, features and advantages of the invention will become apparent from the following description, taken in conjunction with the accompanying drawings which show by way of example a preferred embodiment of the invention.

DESCRIPTION OF PREFERRED EMBODIMENT

Figure 1:
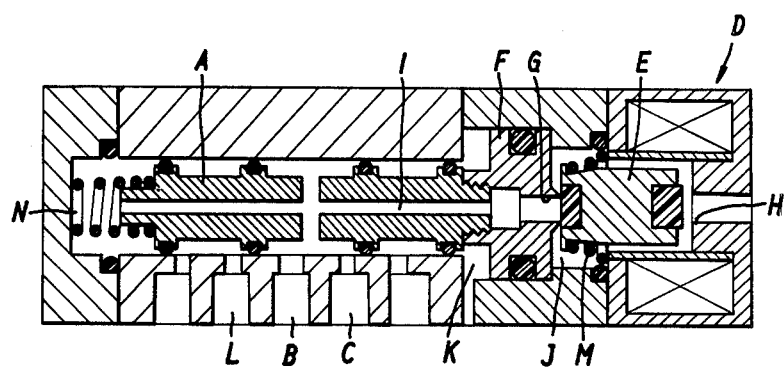
FIG. 1 is a diagrammatic longitudinal cross-section of a conventional solenoid operated change-over valve.
Figure 2:
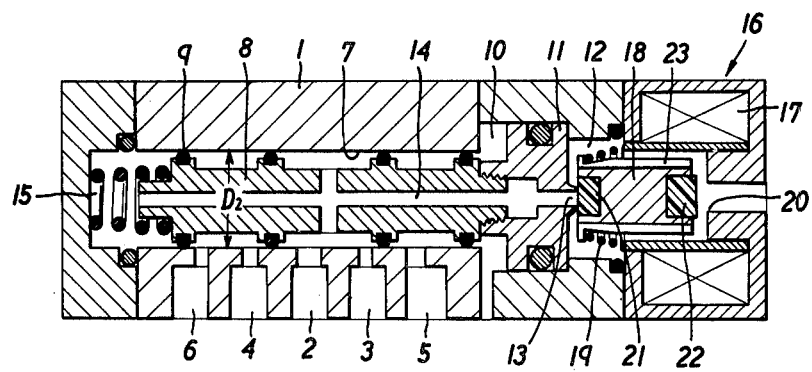
FIGS. 2 and 3 are diagrammatic longitudinal cross-sections showing a solenoid pilot operated change-over valve according to the invention in first and second change-over positions, respectively.

Referring to FIGS. 1 and 2, the solenoid pilot operated change-over valve of the invention has a spool casing 1 which internally defines a spool chamber 7 and has along its length an input port 2, first and second output ports 3 and 4, and first and second drain ports 5 and 6 all in communication with the spool chamber 7. A spool valve 8 with a suitable number of circumferential sealing ridges 9 is slidably received in the spool chamber 7 in the usual manner.

A piston 11 is fixedly mounted at one end of the spool 8 and slidably accommodated within a piston chamber 10 which is provided contiguously on the outer side of the spool chamber 7. The piston 11 is formed with an axial bore communicating at the inner end with an axial passage 14 of the spool 8 and forming at the outer end a pilot valve seat 13 which opens into a pilot chamber 10 on the outer side of the piston chamber 10. The other end of the spool casing 1 is closed fluid-tight by an end casing in which a return spring 15 is mounted to urge the spool 8 constantly toward the first change-over position.

Mounted in and around the pilot chamber 12 is an electromagnetic or solenoid pilot valve component including an electromagnetic coil 17, and a plunger 18 which is axially movable within the pilot chamber 12 toward and away from the pilot valve seat 13 and a drain valve seat 20 which is provided at the outer end of the pilot chamber 12 through the core of the solenoid and constantly urged inwardly by a spring 19. The plunger 18 is provided with resilient seal members 21 and 22 on its inner and outer end faces for fluid-tight secure engagement with the pilot valve seat 13 and the drain valve seat, respectively. The plunger 18 is further provided with a number of axial grooves 23 to facilitate the flow of fluid along its circumference.

The spring 19 suffices to have small stroke length and biasing force necessary only for urging the plunger 18 against the pilot valve seat 13 on the piston which is at the outer end of the piston chamber 10, i.e., in a position closest to the plunger 18. In this connection, it is important to note that the drain valve seat 20 has an effective diameter $d_2$ at least 1.4 times greater than the effective diameter $d_1$ of the pilot valve seat 13 on the piston.

In operation, when the solenoid coil 17 is in a de-energized state, the spool valve 8 is held in the first change-over position, communicating the input port 2 with the first output port 3 while connecting the second output port 4 with the second drain port 6 as shown in FIG. 2. The spool 8 is retained securely in the first change-over position by the combined efforts of the return spring 15 and a pressure differential acting on the opposite ends of the spool 8.

Upon energizing the electromagnetic coil 17, the plunger 18 is attracted electromagnetically to the right or outwardly against the force of the spring 19 to close the drain valve seat 20 while opening the pilot valve seat 13 to admit the fluid pressure into the pilot chamber 12. As a result, the pressure in the pilot chamber 12 is increased to overcome the force of the return spring 15 and urges the piston and spool assembly to the left to assume the second change-over position, communicating the input port 2 with the second output port 4 while connecting the first output port 3 to the first drain port 5.

Under these circumstances, if the solenoid coil is de-energized to shift the spool valve 8 to the first change-over position, the plunger 18 is pushed inwardly by the spring 19 to open the drain valve seat 20. However, since the spring 19 has a small stroke length as mentioned hereinbefore, the plunger 18 stops at an interim position on the boundaries between the piston and pilot chambers, without reaching the pilot valve seat 13 on the piston 11. As the diameter $d_1$ of the pilot valve seat 13 is smaller than the diameter $d_2$ of the drain valve seat 20, the passage of the pressurized fluid is more restricted through the pilot valve seat 13 than through the drain valve seat 20. Therefore, upon uncovering the drain valve seat 20, the pressure prevailing in the piston and pilot chambers 10 and 12 is reduced rapidly to give in to the action of the return spring 15 which thus pushes the spool 8 and piston 11 back into the first change-over position. Whereupon, the pilot valve seat 13 is closed by abutting engagement with the seal member 21 on the inner end face of the plunger 18.

Figure 3:
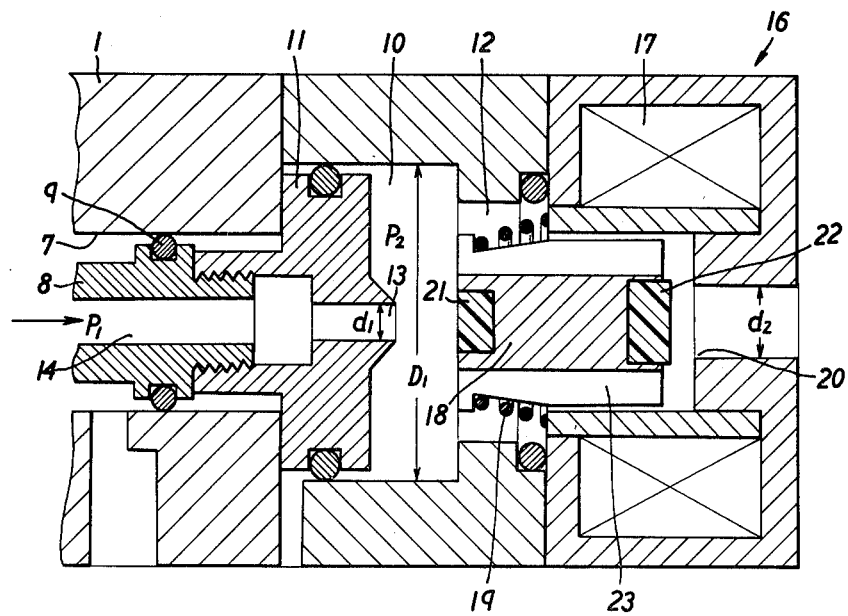

As seen in FIGS. 2 and 3, the force $F_1$ which pushes the piston 11 to the left is $$F_1 = \pi/4\, D_1^2 P_2 \ldots \quad (1)$$

wherein $D_1$ represents the diameter of the piston chamber and $P_2$ represents the pressure within the piston chamber. On the other hand, the force $F_2$ which pushes back the spool 8 to the right is $$F_2 = \pi/4\, D_2^2 P_1 + f_2 \ldots \quad (2)$$

wherein $D_2$ represents the diameter of the spool 8, $P_1$ represents the pressure of fluid at the input port, and $f_2$ represents the biasing force of the return spring 15.

For practical functioning of the change-over valve in a case where the pressurized fluid is compressed air, the velocities of the fluid flows through openings $d_1$ and $d_2$ of the pilot and drain valve seats are considered in the sonic region.

The quantities $Q_1$ and $Q_2$ of the fluid flowing into and out of the piston chamber are $$Q_1 = K d_1^2 (P_1 + 1.03) \ldots \quad (3)$$

$$Q_2 = K d_2^2 (P_2 + 1.03) \ldots \quad (4)$$

wherein K represents the coefficient which determines the flow rate.

Taking $Q_1 = Q_2$ in view of the continuity of the fluid flows, the ratio of $d_2$ to $d_1$ is $$\frac{d_2^2}{d_1^2} = \frac{P_1 + 1.03}{P_2 + 1.03} \quad (5)$$

In order to return the spool valve 8 to the initial position upon de-energization of the solenoid, the following condition has to be satisfied $$F_2 - F_1 - \alpha > 0 \ldots \quad (6)$$

wherein $\alpha$ represents the slide resistance of the seal portions of the spool 8 and piston 11. By substituting (1) and (2) into (6), we obtain the piston chamber pressure $P_2$ $$P_2 < D_2^2/D_1^2\, P_1 + 4/\pi\, (f_2 - \alpha) \ldots \quad (7)$$

By substituting (7) into (5), we obtain $$\frac{d_2^2}{d_1^2} > \frac{P_1 + 1.03}{\dfrac{D_2^2}{D_1^2} P_1 + \dfrac{4}{\pi}(f_2 - \alpha) + 1.03} \quad (8)$$

We can now calculate the ratio of $d_2$ to $d_1$ by incorporating practical figures into inequality (8), for example, $D_1 = 1.8$ cm$^2$, $D_2 = 1$ cm$^2$, $(f_2 - \alpha) = 0.65$, and $P_1 = 7_{bar}$, as follows:

$$d_2^2/d_1^2 > 1.998 = 2 \ldots \quad (9)$$

Thus, the ratio of $d_2$ to $d_1$ is $d_2/d_1 > \sqrt{2} = 1.4$. Namely, the diameter $d_2$ of the drain valve seat 20 should be 1.4 times greater than the diameter $d_1$ of the pilot valve seat 13.

The experiments conducted by the present inventors gave data which approximately corresponded to the results of the above calculation.

Figure 4:
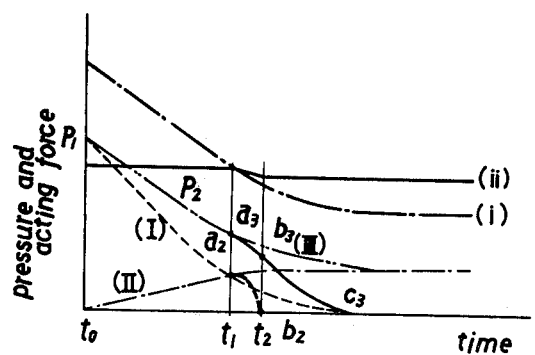
FIG. 4 is a graphical illustration of the operational characteristics of the change-over valve according to the invention.

FIG. 4 graphically illustrates the operational characteristics of the change-over valve according to the invention. The fluid pressure $P_2$ within the piston chamber 10 has a magnitude equal to the pilot pressure $P_1$ at the time point $t_0$ when the solenoid coil 17 is de-energized. If no fluid is admitted into the piston chamber 10 through the pilot valve seat 13 after de-energization of the solenoid device, the pressure $P_2$ of the piston chamber 10 is discharged through the drain valve seat 20 and reduced as shown by curve (I).

On the other hand, if the pilot and drain valve seats 13 and 20 are opened simultaneously when the fluid pressure in the piston chamber 10 is at a level equal to the opening pressure, a saturant pressure increase occurs to the pressure $P_2$ of the piston chamber 10 as shown by curve (II).

Therefore, the curve (III), which is obtained by synthesis of curves (I) and (II), represents the pressure $P_2$ which prevails in the piston chamber 10 after de-energization of the solenoid. The pressure $P_2$ tends to move the piston 11 to the left with a force indicated by curve (i), while the spring 15 constantly urges the spool valve 8 to the right with a force indicated by curve (ii).

As seen in FIG. 4, upon lapse of time $t_1$ from the de-energization of the solenoid, the spring force acting on the spool valve 8 overcomes the fluid pressure which opposingly acts on the piston 11. Whereupon, the spool 8 and piston 11 start to move and complete the shift at $t_2$. However, the flow of fluid into the piston chamber 10 is gradually restricted and reduced as the seal member 21 of the plunger 18 approaches the pilot valve seat 13 and completely blocked as soon as the seal member 21 abuts on the pilot valve seat 13, so that actually the curve (II) varies as shown at $a_2-b_2$ after time $t_1$ and the actual pressure in the piston chamber assume the level indicated at $a_3-b_3$.

It will be appreciated from the foregoing that, with the solenoid pilot operated valve of the invention, the spool/piston assembly is automatically returned to the initial position without closing the pilot valve seat with the plunger in the initial stage of the second-to-first shift operation. It is no longer necessary for the plunger to have a large stroke length comparable to that of the spool. A plunger with a minimized stroke length has great advantages as one can use a spring of small stroke length and biasing force on the plunger and simplify the valve designing and manufacturing processes and the construction of the pilot section as well as the construction of the valve as a whole.

What is claimed is:

1. A solenoid pilot operated change-over valve comprising, in combination:

a spool casing closed at one end and internally defining a spool chamber, the spool casing being provided along the length thereof with an input port and a number of output and drain ports in communication with said spool chamber;

a spool valve slidably received in said spool chamber and circumferentially having a number of sealing ridges to connect said output ports selectively either with said input port or one of said drain ports;

a fluid passage formed axially through said spool valve in communication with said input port;

a piston chamber provided contiguously to the other open end of said spool casing;

a piston rigidly mounted at one end of said spool disposed at said open end of said spool casing and axially slidable within said piston chamber, said piston having an axial bore communicating at the inner end thereof with said axial fluid passage in said spool and forming at the outer end thereof a pilot valve seat of a suitable effective diameter;

a pilot chamber provided contiguously on the outer side of said piston chamber and having at an outer end thereof a drain valve seat of an effective diameter at least 1.4 times greater than that of said pilot valve seat on said piston;

a plunger accommodated within said pilot chamber and axially movable to open and close said pilot and drain valve seats;

a spring loaded on said plunger for constantly urging the plunger toward said pilot valve seat, said spring having a combined force and stroke length sufficient to move said plunger into abutment with said pilot valve seat only when said piston is positioned at a first change-over position;

a solenoid device mounted in and around said pilot chamber and actuatable to attract said plunger electromagnetically away from said pilot valve seat against the force of said plunger biasing means and to seat said plunger securely on said drain valve seat, thereby introducing fluid pressure into said pilot chamber for shifting said spool and piston from said first to a second change-over position; and a return spring mounted at said closed end of said spool casing and acting on the other end of said spool valve to return said spool to the initial position, said return spring and a pressure differential acting upon the opposite ends of the spool valve to retain said spool valve securely in said first and second change-over positions until said solenoid is either activated or deactivated.

* * * * *